United States Patent [19]

Katsuyama et al.

[11] Patent Number: 5,793,563
[45] Date of Patent: Aug. 11, 1998

[54] MAGNETIC TAPE LIBRARY APPARATUS HAVING LEADER BLOCK ENGAGING MECHANISM

[75] Inventors: Yukio Katsuyama; Hiroyuki Sugihara, both of Kawasaki, Japan

[73] Assignee: Fujitsu Limited, Kawasaki, Japan

[21] Appl. No.: 590,085

[22] Filed: Jan. 24, 1996

Related U.S. Application Data

[62] Division of Ser. No. 52,656, Apr. 26, 1993, abandoned.

[30] Foreign Application Priority Data

| Apr. 28, 1992 | [JP] | Japan | 4-109637 |
| May 26, 1992 | [JP] | Japan | 4-133626 |
| Feb. 10, 1993 | [JP] | Japan | 5-022225 |

[51] Int. Cl.$^6$ .......................... G11B 15/68; G11B 33/12
[52] U.S. Cl. .......................... 360/92; 242/337
[58] Field of Search .......................... 360/92, 96.5–96.6; 242/337, 338, 338.4

[56] References Cited

U.S. PATENT DOCUMENTS

| 4,835,634 | 5/1989 | Ostwald | 360/92 |
| 4,907,889 | 3/1990 | Simone | 360/92 |
| 4,932,826 | 6/1990 | Moy et al. | 360/92 |
| 4,945,429 | 7/1990 | Munro et al. | 360/92 |
| 5,285,333 | 2/1994 | Barr et al. | 360/92 |

FOREIGN PATENT DOCUMENTS

| 4121461 | 1/1993 | Germany | 360/92 |
| 1-208759 | 8/1989 | Japan | 360/92 |
| 1-292665 | 11/1989 | Japan | 360/92 |
| 2-081352 | 3/1990 | Japan | 360/92 |
| 2-177165 | 7/1990 | Japan . | |
| 03-209664 | 9/1991 | Japan | 360/92 |
| 3-160951 | 11/1991 | Japan . | |
| 3-259451 | 11/1991 | Japan . | |
| 3-121547 | 12/1991 | Japan . | |
| 5-006603 | 1/1993 | Japan | 360/92 |

*Primary Examiner*—Craig A. Renner
*Attorney, Agent, or Firm*—Greer, Burns & Crain, Ltd.

[57] ABSTRACT

A magnetic tape library apparatus having mechanisms for reengaging a disengaged leader block of any magnetic tape cartridge entered. The apparatus comprises a cell unit having a plurality of cells each accommodating a magnetic tape cartridge, a magnetic tape drive unit for writing and reading data to and from the magnetic tape in the magnetic tape cartridge, and an accessor for automatically switching magnetic tape cartridges between the cell unit and the magnetic tape drive unit. The magnetic tape library apparatus further comprises a stacker for stacking a plurality of magnetic tape cartridges entered externally, and a delivery mechanism for selecting one of the magnetic tape cartridges stacked in the stacker for delivery to the accessor. Adjacent to the delivery mechanism is a hammer mechanism that hits the leader block for engagement with a latch.

3 Claims, 20 Drawing Sheets

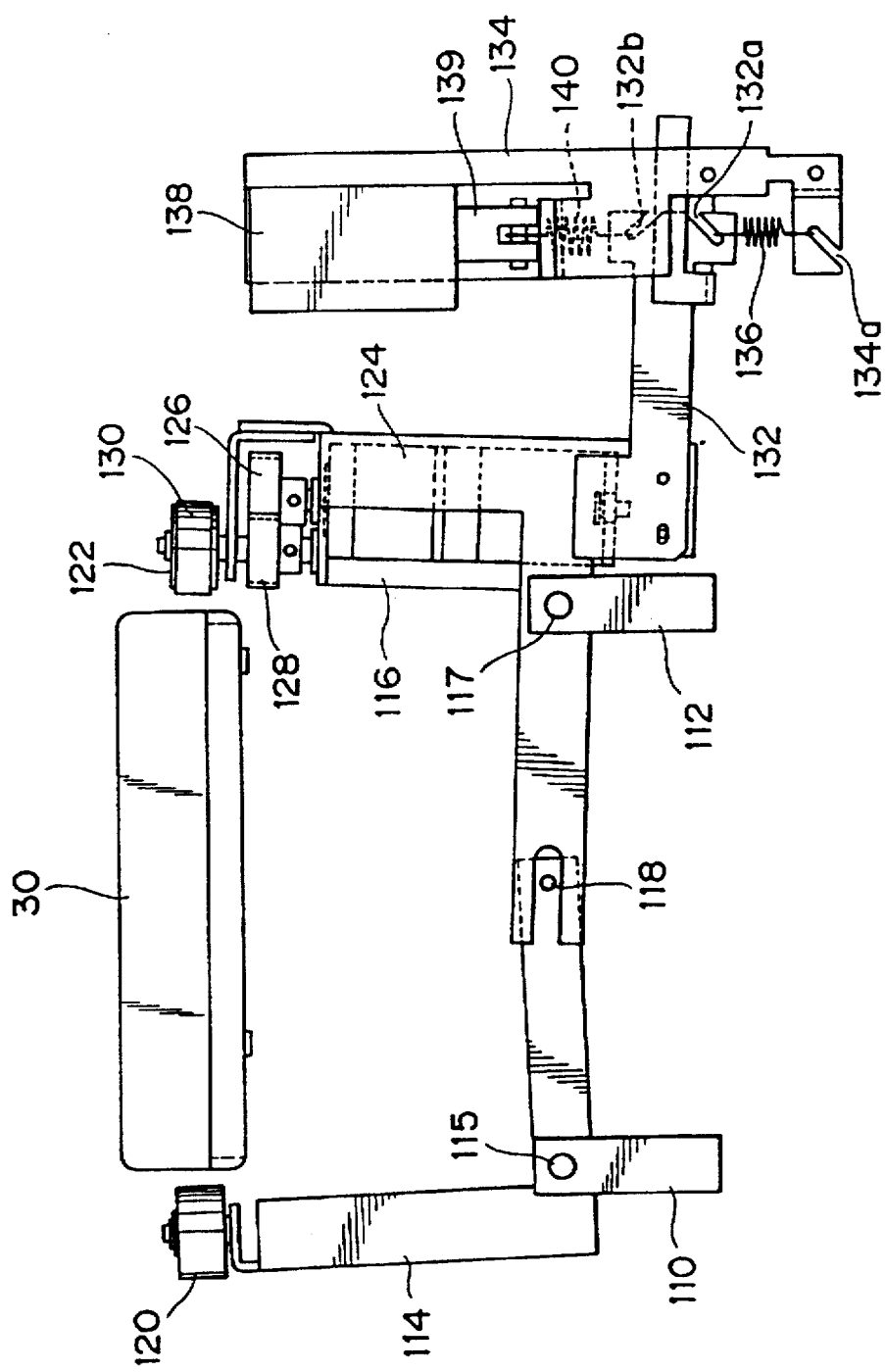

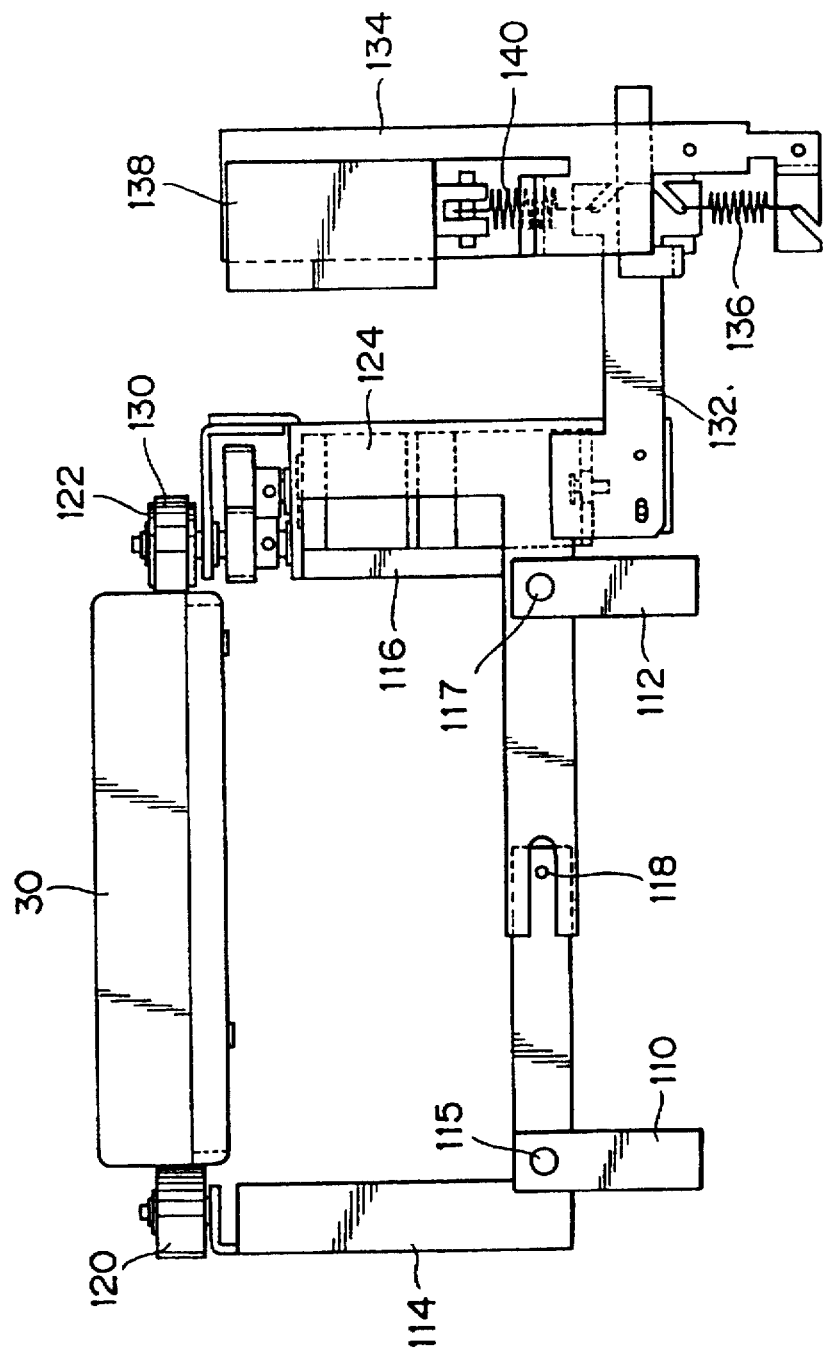

5,793,563

1
MAGNETIC TAPE LIBRARY APPARATUS HAVING LEADER BLOCK ENGAGING MECHANISM

This is a divisional, of application Ser. No. 08/052,656, filed Apr. 26, 1993, now abandoned.

BACKGROUND OF THE INVENTION

1. Field of the Invention

The present invention relates generally to a magnetic tape library apparatus. More particularly, the invention relates to a leader block engaging mechanism, provided in the magnetic tape library apparatus, for engaging a leader block of a magnetic tape cartridge with a latch formed therein.

2. Description of the Related Art

Magnetic tape units are one of diverse kinds of external storage devices for use with computers. The magnetic tape units operate most commonly on what is known as the open reel system using 0.5-inch wide tapes. The chores of manually loading the open reels have been alleviated by widening acceptance of automatic tape loading devices. Today, operators' burdens are further alleviated by the widespread use of magnetic tape cartridges. A magnetic tape cartridge, accommodating a tape having the same width as that of open reel tapes, allows the tape to be threaded out of the reel within for automatic tape loading.

A plurality of magnetic tape cartridges needed are entered in the magnetic tape library apparatus. Any one of the cartridges is selected and loaded to a magnetic tape drive unit for data recording and reproduction. The magnetic tape library apparatus comprises a cell unit having a plurality of cells each accommodating a magnetic tape cartridge; a magnetic tape drive unit for recording and reproducing data; and an accessor for automatically switching magnetic tape cartridges between cell unit and magnetic tape drive unit. Magnetic tape library apparatuses of this kind are widely used as an external mass storage device for computers. These apparatuses are required to operate unfailingly when unattended.

The magnetic tape cartridge has a leader block attached to the tip of the magnetic tape it contains. In operation, a sled arm in the magnetic tape drive unit catches the leader block of the cartridge and attaches it to a machine reel in the drive unit. The magnetic tape drive unit then runs the tape for writing or reading data thereto or therefrom.

The magnetic tape cartridges contained in the cell unit are gripped one by one selectively by the accessor and loaded into the magnetic tape drive unit. The magnetic tape cartridge to or from which the magnetic tape drive unit has finished writing or reading data is caught by the accessor and returned to that cell in the cell unit which has the address corresponding to the cartridge.

Before the magnetic tape cartridge is ejected from the magnetic tape drive unit, the entire tape is wound into the cartridge and the sled arm of the drive unit engages the leader block of the tape with a latch of the cartridge.

It may happen somehow that the leader block of the tape is not fully engaged with the latch of the magnetic tape cartridge prior to ejection of the cartridge from the magnetic tape drive unit. The incomplete engagement of the leader block with the latch may lead to an inadvertent disengagement of the leader block while the cartridge is being handled within the magnetic tape library apparatus. The leader block may also be disengaged while the magnetic tape cartridge is being transported. Where the engagement of the leader block is incomplete but not conspicuous enough for the operator to notice, the cartridge with its leader block half disengaged will be placed into the magnetic tape library apparatus. This can lead subsequently to an outright disengagement of the leader block attributable to otherwise insignificant impact or vibration during operation.

Before entering each magnetic tape cartridge into the magnetic tape library apparatus, the operator usually checks to see if the leader block of the tape is securely engaged with the latch of the cartridge. However, when hundreds of magnetic tape cartridges need to be placed in magnetic tape library apparatuses at a work site, it is difficult to check all cartridges with the same degree of care and attention. In particular, if the leader block is disengaged only slightly, the operator is more likely to overlook the fault however attentive he or she may try to be in visual inspection.

When the magnetic tape cartridge with its leader block disengaged is loaded by an accessor into the magnetic tape drive unit, a sled pin of the latter cannot engage with an engagement groove of the leader block. This results in a tape loading failure. Most of the cases of leader block disengagement are detected by sensor as tape loading failures. When a tape loading failure is detected, the magnetic tape cartridge in question is either placed by the accessor into a reserve cell or ejected outside the magnetic tape library apparatus as a faulty cartridge, to be dealt with later.

The cartridge ejected outside the magnetic tape library apparatus as a result of tape load failure needs to have its leader block engaged manually and to be entered again into the apparatus. During an unattended operation (e.g., overnight operation), however, none of these faulty cartridges are processed. This can be a serious impediment to improving the operating efficiency of the magnetic tape library apparatus that operates generally unattended.

SUMMARY OF THE INVENTION

It is therefore an object of the present invention to provide a magnetic tape library apparatus having a mechanism for correctly engaging a disengaged leader block of a magnetic tape cartridge inside the apparatus.

It is another object of the invention to provide a magnetic tape library apparatus having a leader block engaging mechanism whereby the reliability and operating efficiency of the apparatus are improved significantly.

In accordance with an aspect of the present invention, there is provided a magnetic tape library apparatus comprising: a cell unit having a plurality of cells each accommodating a magnetic tape cartridge, the magnetic tape cartridge containing a magnetic tape, a leader block attached to the tip of the magnetic tape and a latch for engaging with the leader block; a magnetic tape drive unit for writing and reading data to and from the magnetic tape in the magnetic tape cartridge; an accessor for automatically switching magnetic tape cartridges between the cell unit and the magnetic tape drive unit; stacker means for stacking a plurality of magnetic tape cartridges entered externally; delivery means for selecting one of the plurality of magnetic tape cartridges stacked in the stacker means for delivery to the accessor, the delivery means including retaining means for retaining the selected magnetic tape cartridge; and leader block engaging means for pushing the leader block of the magnetic tape cartridge retained by the retaining means so that the leader block engages with the latch.

In a preferred structure according to the invention, the leader block engaging means comprises: a hammering member attached rotatably about a shaft; biasing means for biasing the hammering member away from the leader block; and a solenoid for driving the hammering member against the biasing force of the biasing means.

In accordance with another aspect of the present invention, there is provided a magnetic tape library apparatus comprising: a cell unit having a plurality of cells each accommodating a magnetic tape cartridge, the magnetic tape cartridge containing a magnetic tape, a leader block attached to the tip of the magnetic tape and a latch for engaging with the leader block; a magnetic tape drive unit for writing and reading data to and from the magnetic tape in the magnetic tape cartridge; an accessor for automatically switching magnetic tape cartridges between the cell unit and the magnetic tape drive unit, the accessor including a guide furnished perpendicularly, a hand mechanism attached to the guide so as to swing horizontally on a plane perpendicular to the guide, and first driving means for moving the hand mechanism within a horizontal plane; and leader block engaging means provided on and operable in a rotating locus of the magnetic tape cartridge held by the hand mechanism.

In another preferred structure according to the invention, the leader block engaging means comprises a pin adapted to contact with the leader block in a pressable manner, and a spring for urging the pin toward pressure contact with the leader block.

In accordance with a still further aspect of the present invention, there is provided a magnetic tape library apparatus comprising: a cell unit having a plurality of cells each accommodating a magnetic tape cartridge, the magnetic tape cartridge containing a magnetic tape, a leader block attached to the tip of the magnetic tape and a latch for engaging with the leader block; a magnetic tape drive unit for writing and reading data to and from the magnetic tape in the magnetic tape cartridge; an accessor for automatically switching magnetic tape cartridges between the cell unit and the magnetic tape drive unit; a plurality of projections each provided on each of the cells in the cell unit; and cartridge pushing means provided on the accessor for pushing the magnetic tape cartridge into an appropriate one of the cells, the cartridge pushing means further pushing the leader block of the magnetic tape cartridge onto the projection of the appropriate cell to get the leader block engaged with the latch.

Instead of the cell unit having each of the cells therein equipped with a projection, the library apparatus may contain an additional, separate cell for engaging the leader block, the additional cell having a similar projection.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 11A is a schematic front view of a feeder mechanism of the magnetic tape cartridge entry device, the figure illustrating the feeder being opened;

FIG. 11B is similar to FIG. 11A but showing the feeder being closed;

DESCRIPTION OF THE PREFERRED EMBODIMENTS

Figure 1:
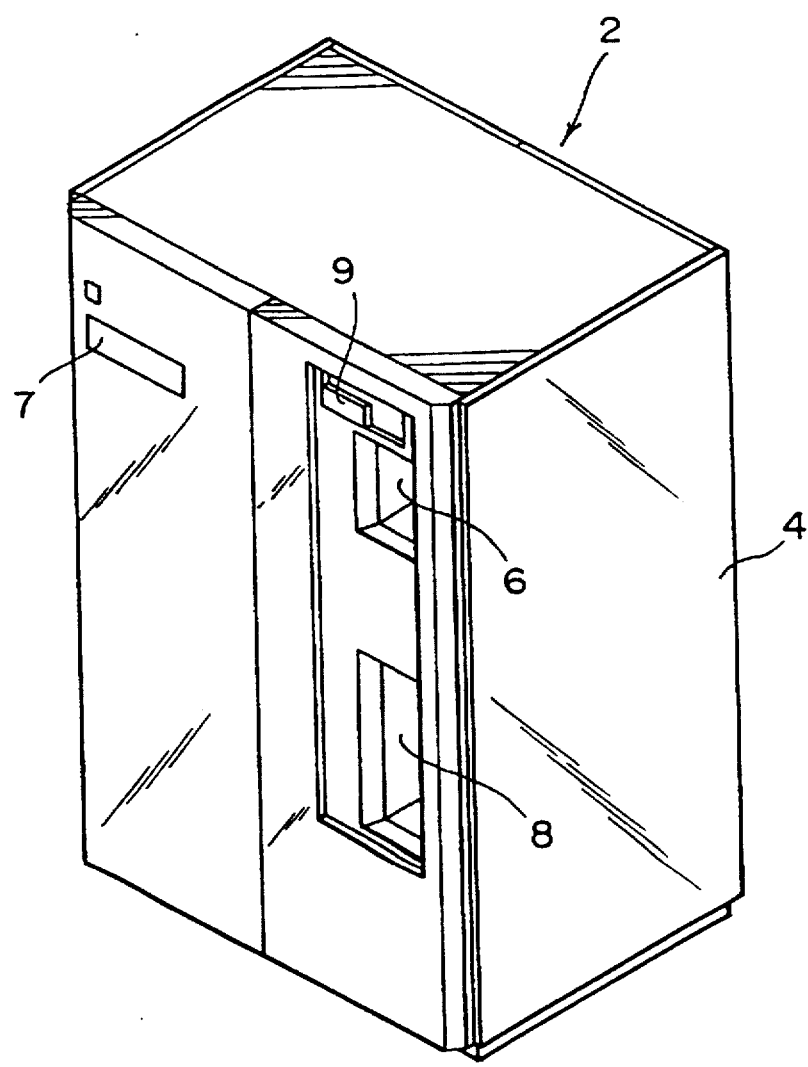
FIG. 1 is a front perspective view of a magnetic tape library apparatus embodying the invention.
Figure 2:
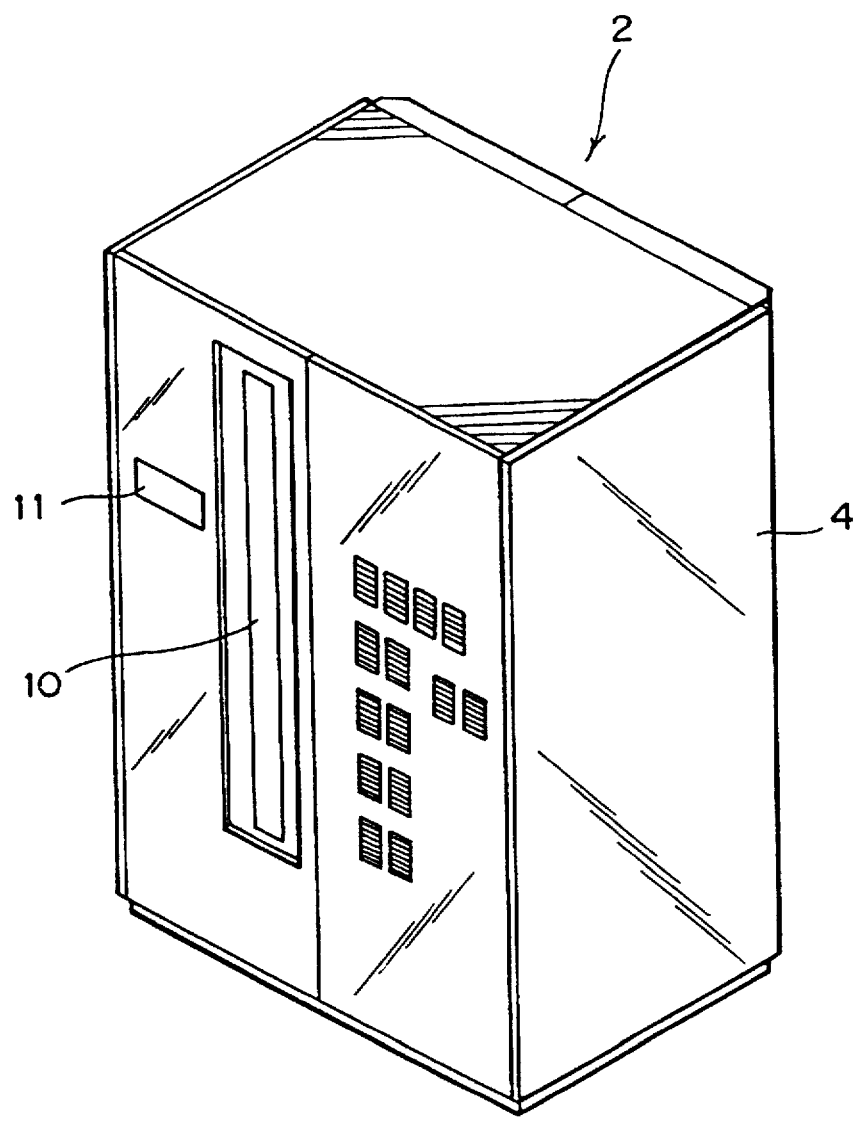
FIG. 2 is a rear perspective view of the embodiment of FIG. 1.

FIG. 1 is a front perspective view of a magnetic tape library apparatus 2 practiced as one preferred embodiment of the invention, and FIG. 2 is a rear perspective view of the embodiment. A housing 4 of the magnetic tape library apparatus 2 has at its front a cartridge entry opening 6, a cartridge exit opening 8 and operation panels 7 and 9. The cartridge entry opening 6 is capable of admitting up to, say, 10 magnetic tape cartridges at a time. The cartridge exit opening 8 stacks up to, say, 15 cartridges at a time. At the back of the housing 4 is a mass cartridge entry/exit mechanism 10 that places a large number of cartridges into a row of cells in a cell unit, to be described later. Reference numeral 11 denotes an operation panel.

Figure 3:
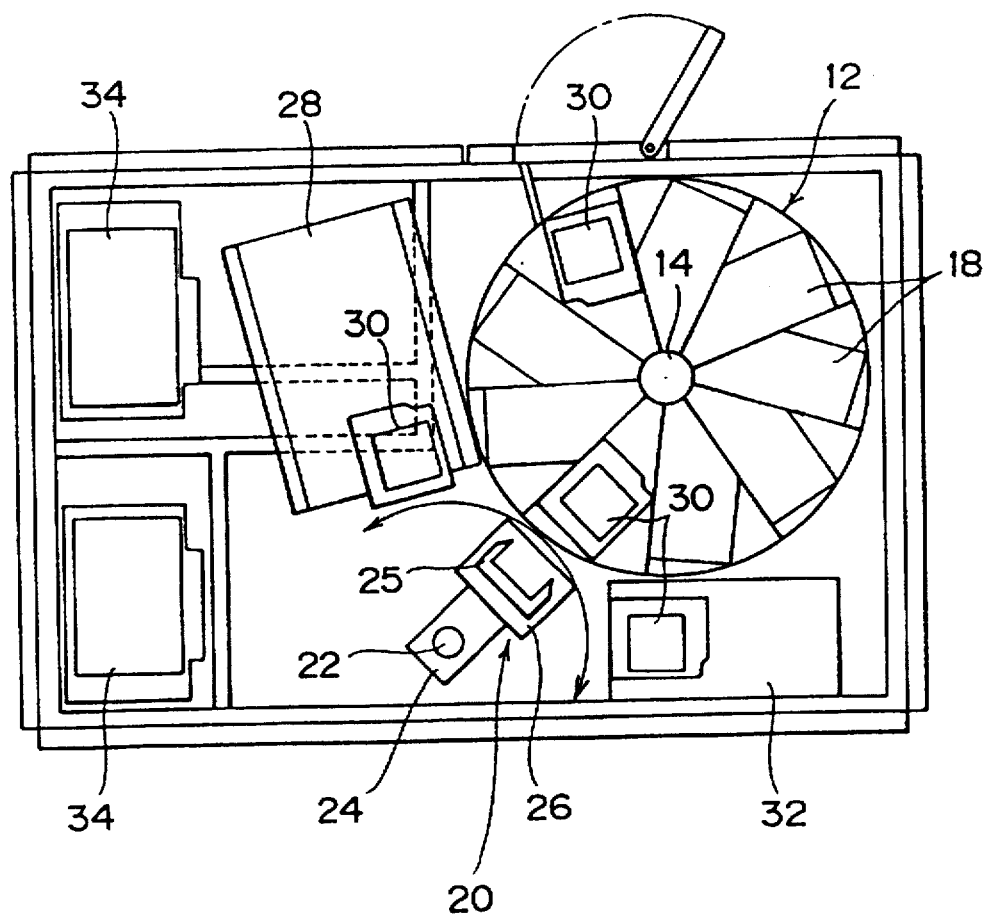
FIG. 3 is a schematic plan view of the embodiment with a top plate of its housing removed.
Figure 4:
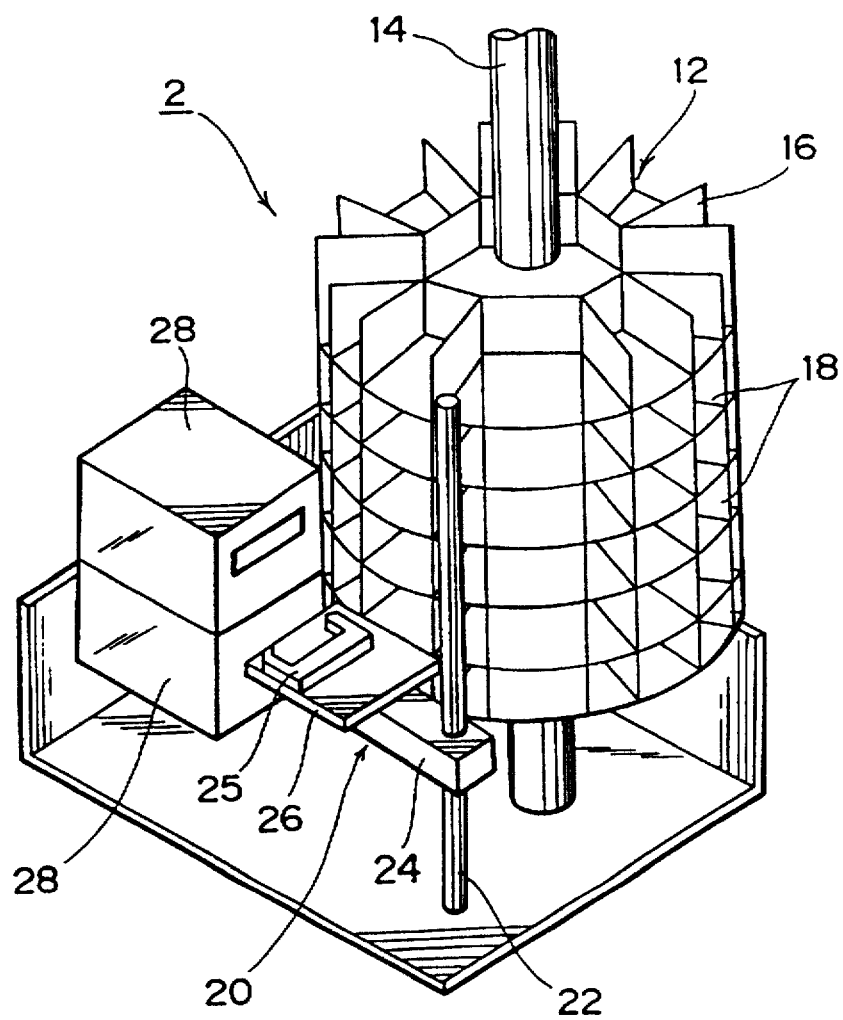
FIG. 4 is a schematic perspective view showing the inside of the embodiment.

In FIGS. 3 and 4, a cell drum 12 is attached rotatably to a rotary shaft 14, the drum having a plurality of cells 18 separated by partitions 16. Adjacent to the cell drum 12 are two magnetic tape drive units 28 for writing and reading data to and from magnetic tapes. Between the cell drum 12 and the magnetic tape drive units 28 is an accessor 20 that automatically switches magnetic tape cartridges 30 therebetween; the cartridges 30 are to be loaded into the magnetic tape drive units 28 for read and write operations. In FIG. 3, reference numeral 32 denotes a cartridge entry and exit unit and 34 controllers.

Figure 5:
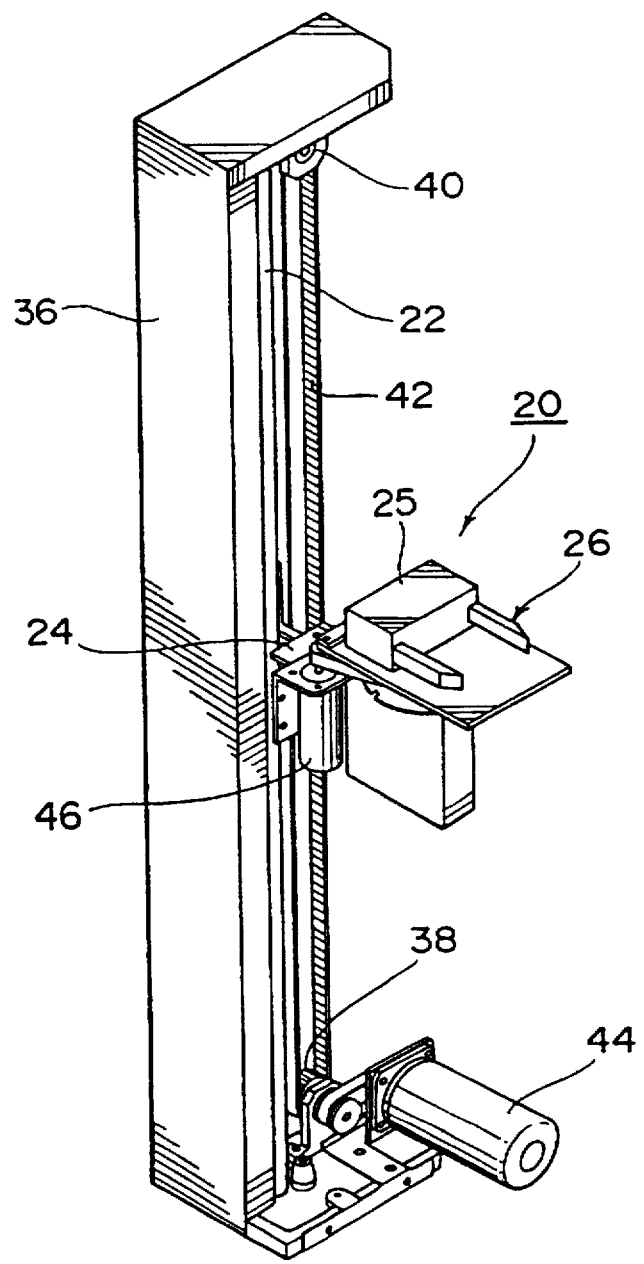
FIG. 5 is a schematic perspective view of an accessor drive mechanism as part of the embodiment.

The drive mechanism of the accessor 20 is constructed as shown in FIG. 5. A driving pulley 38 and a driven pulley 40 are attached rotatably to an approximately C-shaped support member 36. A timing belt 42 is threaded around the pulleys 38 and 40 in an endless manner. The C-shaped support member 36 is secured with a guide member 22 extending perpendicularly. Another support member 24 is fixed to the timing belt 42. One end of the support member 24 is engaged with the guide member 22. A hand mechanism 26 with a grip hand 25 is mounted on the support member 24.

When a motor 44 is activated, the support member 24 fixed to the timing belt 42 moves up and down, guided by the guide member 22. That in turn moves vertically the hand mechanism 26 mounted on the support member 24. When a motor 46 is activated, the support member 24 swings horizontally, with the guide member 22 acting as the center of the swing motion. That is, the hand mechanism 26 also swings horizontally. When the motors 44 and 46 are activated selectively under appropriate control, the hand mechanism 26 is led to gain access to a selected cell 18 in the cell drum 12 as well as to a selected magnetic tape drive unit 28.

The drive mechanism of the accessor 20 is appreciably simplified because it is composed only of the above-described vertical direction drive mechanism and of the swing mechanism centering on the guide member 22. In practice, the ell drum 12, magnetic tape drive units 28 and cartridge entry/exit unit 32 are located around the accessor 20 in such a manner that largely the swing motion of the accessor 20 alone (along with a limited vertical movement) will effect delivery of magnetic tape cartridges among these components.

Figure 6:
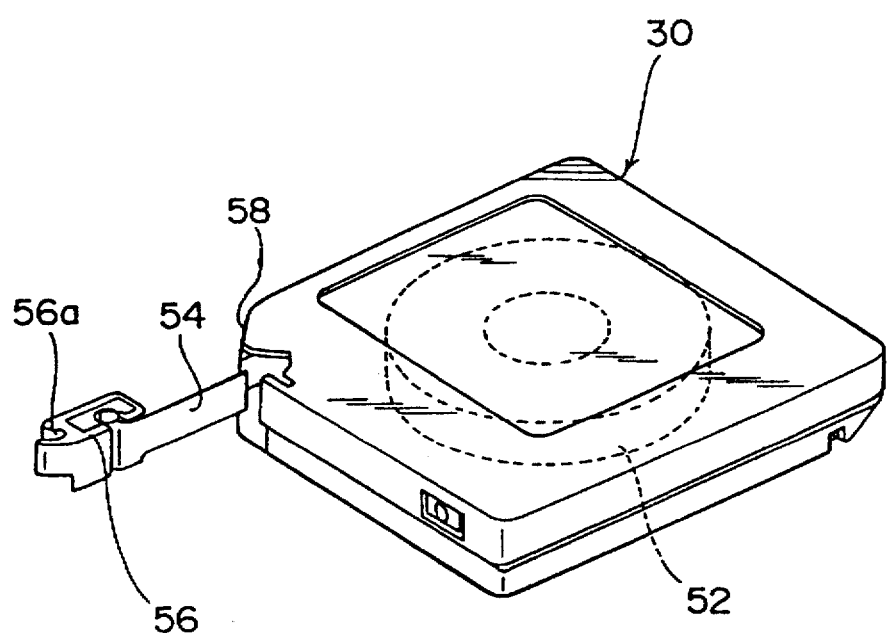
FIG. 6 is an external perspective view of a magnetic tape cartridge.

Referring to FIG. 6, a tape reel 52 is housed rotatably inside a magnetic tape cartridge 30. The base of a magnetic tape 54 is secured to the tape reel 52, and the intermediate tape portion starting from the base is wound around the reel 52. The tip of the magnetic tape 54 is equipped fixedly with a leader block 56. The leader block 56 has an engagement groove 56a with which a sled pin of the magnetic tape drive unit 28 is to be engaged, as will be described later in more detail.

Figure 7:
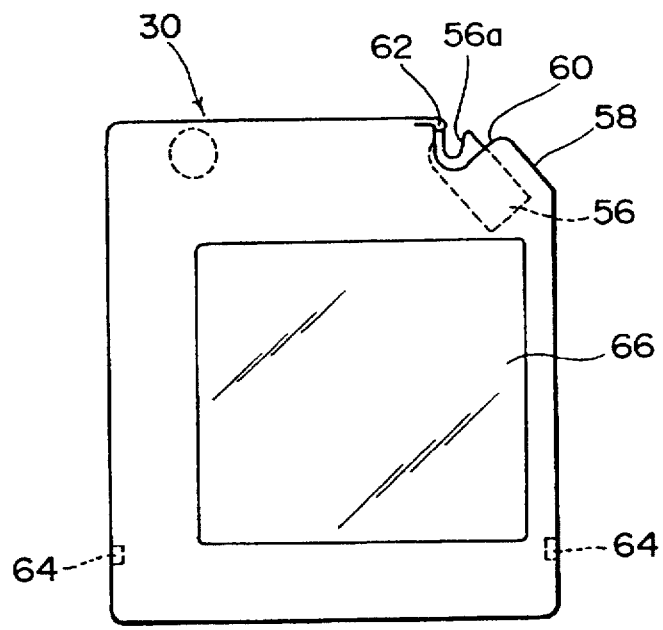
FIG. 7 is a plan view of a magnetic tape cartridge with a leader block engaged in place.
Figure 8:
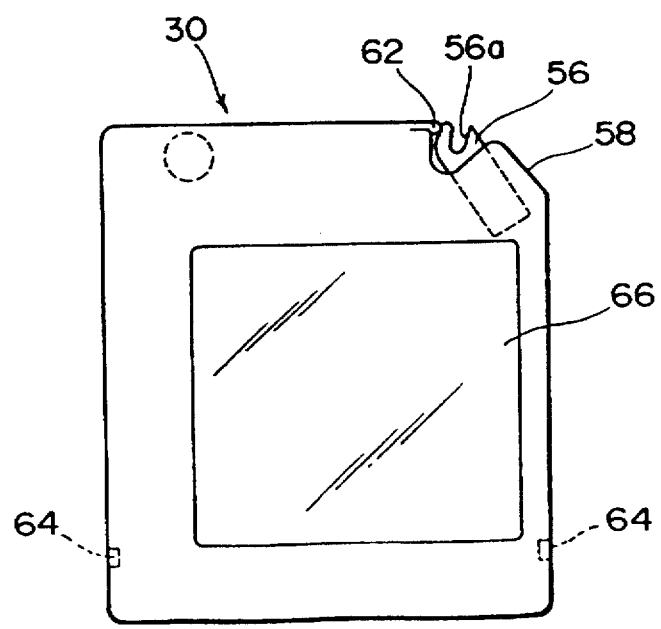
FIG. 8 is a plan view of the magnetic tape cartridge with the leader block disengaged.

FIG. 7 is a plan view of the magnetic tape cartridge 30 with the leader block 56 engaged in place, and FIG. 8 is a plan view of the magnetic tape cartridge 30 with the leader block 56 disengaged. One corner of the cartridge 30 has a cutout 58. Near the cutout 58 is an opening 60 through which the magnetic tape 54 is drawn out of the cartridge 30. The leader block 56 is inserted in the opening 60. Normally, the leader block 56 is engaged with a latch 62 formed on the cartridge 30.

A label 66 is pasted on the surface of the cartridge 30. Grooves 64 are formed on both sides of the cartridge back. Normally, the leader block 56 is engaged securely with the latch 62 as shown in FIG. 7. If the leader block 56 is disengaged from the latch 62, as illustrated in FIG. 8, it is impossible to load the magnetic tape 30 into the magnetic tape drive unit 28.

The magnetic tape library apparatus 2 according to the invention has mechanisms intended to engage the leader block 56, which may be disengaged inadvertently as described, with its corresponding latch. The constitution and the operation of the apparatus to achieve that and other objects will now be described in more detail with reference to the accompanying drawings.

Figure 9:
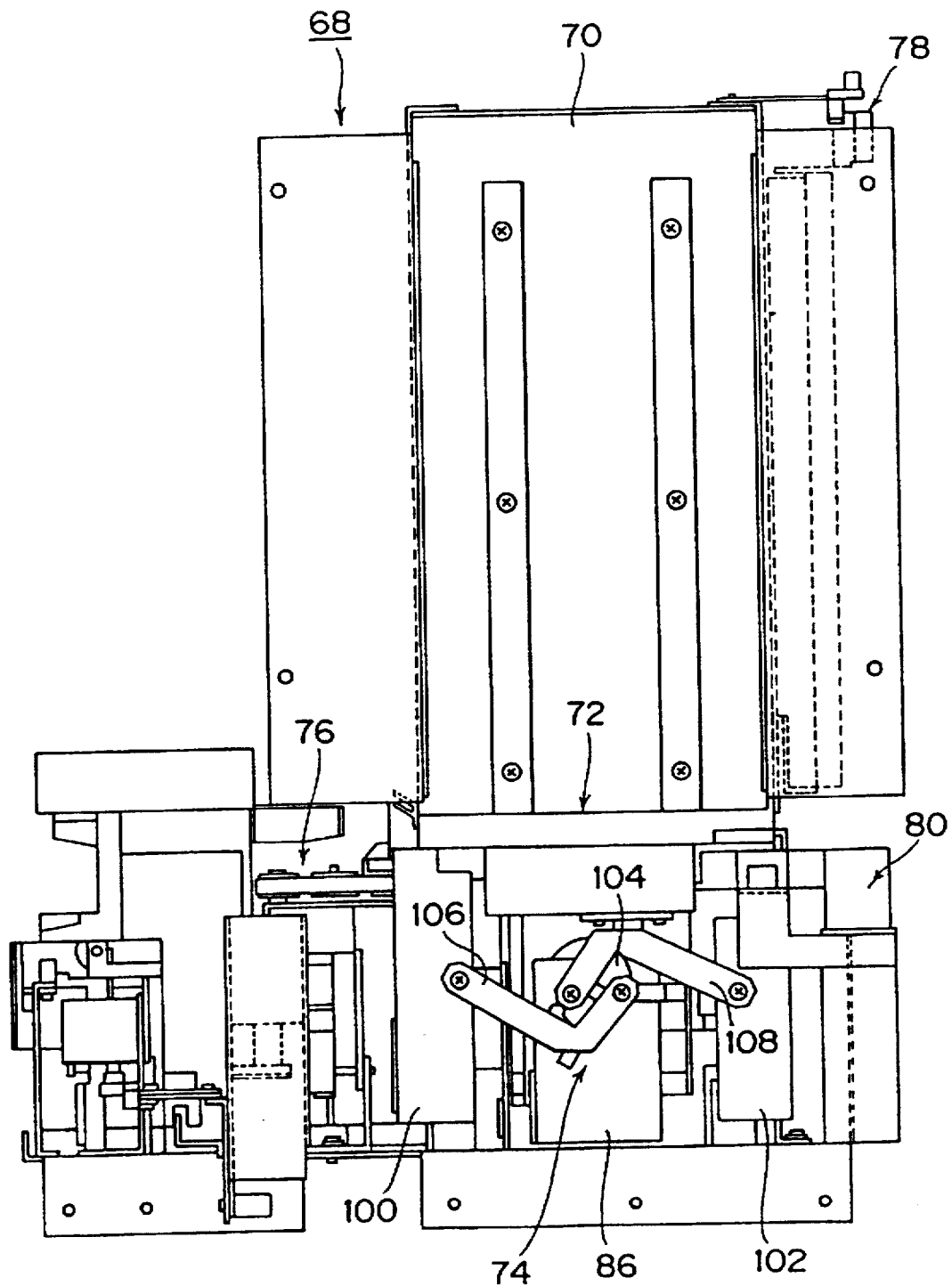
FIG. 9 is a front view of a magnetic tape cartridge entry device as part of the embodiment.

FIG. 9 is a front view of a cartridge entry device 68 for entering magnetic tape cartridges into the magnetic tape library apparatus 2. The cartridge entry device 68 comprises a stacker 70 for stacking a plurality of magnetic tape cartridges, a stage mechanism 72, a hook mechanism 74, a feeder mechanism 76, and a hammer mechanism 80. The stacker 70 is a box-like part that admits a plurality of magnetic tape cartridges 30 entered by an operator. The stacker 70 is connected to the cartridge entry opening 6 shown in FIG. 1. Cartridges 30 entered into the stacker 70 are stacked thereby onto a stage 82 of the stage mechanism 72. A gate sensor 78 checks to see if the stacked cartridges 30 are correctly entered.

As will be explained later in more detail, the stage mechanism 72 moves the stage 82 up and down. The hook mechanism 74 separates the lowest-positioned cartridge alone from the remaining multiple cartridges 30 stacked on the stage 82. The feeder mechanism 76 transports to the accessor 20 the single cartridge 30 separated from the cartridge stack by the hook mechanism 74. The hammer mechanism 80, a key component of the invention, hits the leader block 56 of the cartridge 30 gripped by the feeder mechanism 76 so that the leader block 56 will engage securely with the latch 62.

The constitution and the operation of the stage mechanism 72 and hook mechanism 74 will now be described with reference to FIGS. 10A and 10B. Brackets 86, 96 and 98 are fixed to a frame 84. A stage motor, not shown, is coupled to a gear 87. A gear 88 engaged with the gear 87 is attached fixedly to a shaft 90 supported rotatably by the bracket 86. A stage cam 92 is fixed eccentrically to the shaft 90. A cam follower 94 that follows the stage cam 92 is attached rotatably to the stage 82. A front hook 100 is attached pivotably to the bracket 96. A rear hook 102 is pivotably mounted to the bracket 98. A side hook, not shown, is also attached in like manner. As depicted in FIG. 9, one end of an L-shaped arm 106 is pivotably attached to the front hook 100, and one end of an L-shaped arm 108 is pivotably attached to the rear hook 102. The other ends of the arms 106 and 108 are pivotably mounted to eccentric shafts of a disc 104. The disc 104 is coupled to a hook motor, not shown.

Figure 10A:
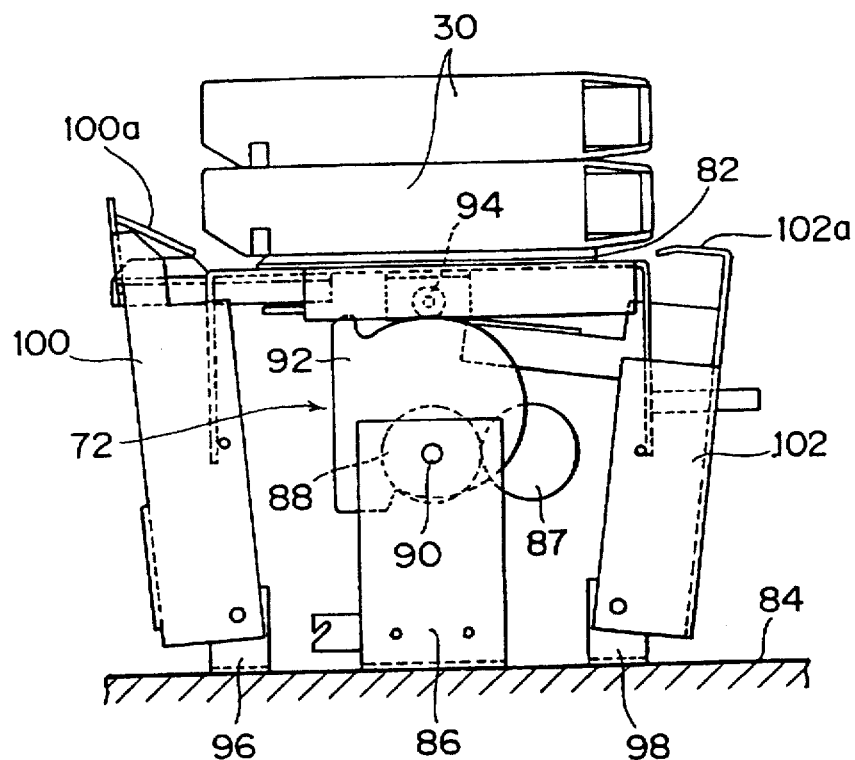
FIG. 10A is a schematic front view of a stage mechanism and a hook mechanism of the magnetic tape cartridge entry device, the figure showing the stage at its highest position.
Figure 10B:
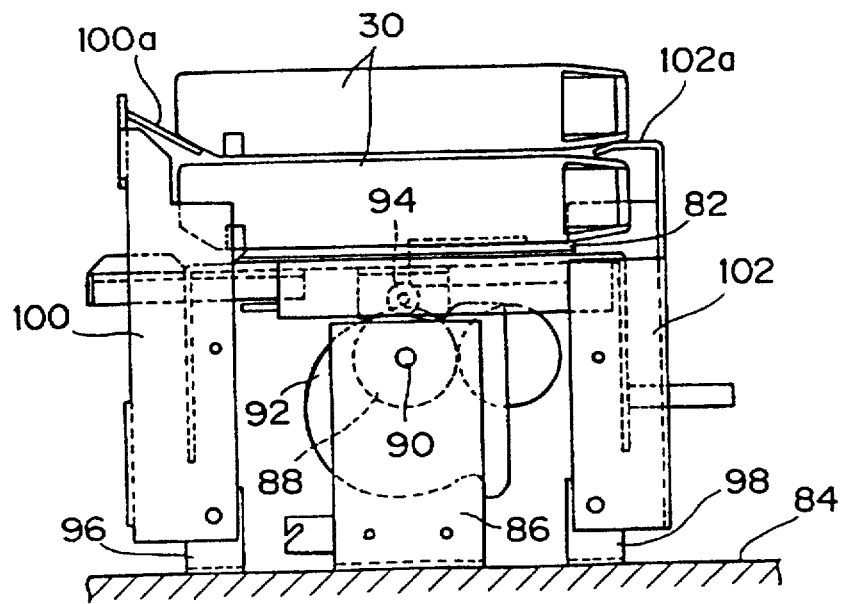
FIG. 10B is similar to FIG. 10A but showing the stage at its lowest position.

FIG. 10A shows the stage 82 at its highest position, with the front hook 100, rear hook 102 and side hook all opened. These hooks are located away from the cartridges 30 on top of the stage 82. In this state, the stage 82 is raised to its highest position by the stage cam 92. With the stage 82 at its highest position, activating the stage motor causes the stage cam 92 to turn counterclockwise and thereby lower the stage 82. The cartridges 30 placed on the stage 82 also come down together. When the stage 82 reaches its lowest position, the hook motor is activated to rotate the disc 104 of FIG. 9 counterclockwise. This in turn rotates the front hook 100 and rear hook 102 in a direction in which they approach each other. As illustrated in FIG. 10B, a tip 100a of the front hook 100 and a tip 102a of the rear hook 102 are inserted between the lowest cartridge and the next-lowest cartridge stacked on the stage 82. The tips of the front and rear hooks 100 and 102 raise the next-lowest cartridge and those above it so as to separate the lowest cartridge 30 therefrom.

The lowest cartridge 30 thus separated is gripped by the feeder mechanism 76 and transported thereby to an appropriate position for delivery to the accessor 20. The constitution and the operation of the feeder mechanism 76 will now be described with reference to FIGS. 11A and 11B. L-shaped catch arms 114 and 116 are attached with pins 115 and 117 pivotably to brackets 110 and 112, respectively. The catch arms 114 and 116 are coupled rotatably by use of a pin 118. A plurality of rollers 120 are attached rotatably to the top of the catch arm 114. One feed roller 122 and a plurality of rollers 123 are attached rotatably to the top of the catch arm 116. An endless belt 130 is threaded around the feed roller 122 and the rollers 123. The catch arm 116 is provided with a feed motor 124 that drives the feed roller 122 via gears 126 and 128 when activated.

An actuator member 132 is connected to the catch arm 116. Two engagement grooves 132a and 132b are formed at the tip of the actuator member 132. The bottom of a support member 134 has an engagement groove 134a. Both ends of a coil spring 136 are engaged with the engagement grooves 132a and 134a. A self-holding type feeder solenoid 138 is mounted to the support member 134. A coil spring 140 is disposed between a plunger 139 of the feeder solenoid 138 and the engagement groove 132b of the actuator member 132.

When the solenoid 138 is not magnetized, the actuator member 132 is pulled downward by the coil spring 136. This causes the two catch arms 114 and 116 to rotate away from each other. As shown in FIG. 11A, the roller 120 and feed belt 130 are not in contact with the sides of the cartridge 30. In this state, momentarily magnetizing the self-holding type solenoid 138 causes the plunger 139 to spread the coil spring 140 and to raise the actuator member 132 against the force of the coil spring 136. That in turn rotates the two catch arms 114 and 116 toward each other. As depicted in FIG. 11B, the roller 120 and feed belt 130 come in elastic contact with the sides of the cartridge 30. In this state, activating the feed motor 124 rotates the feed belt 130 to transport the cartridge 30 to the appropriate position for delivery to the accessor 20.

The cartridge 30 separated by the hook mechanism 74 is transported by the feeder mechanism 76 in the above manner to the accessor 20. When the cartridge 30 is gripped by the two catch arms 114 and 116, as illustrated in FIG. 11B, the hammer mechanism 80 hits the leader block 56 of the cartridge to push it into position.

How the leader block 56 is pushed into position will now be described with reference to FIG. 12. The hammer mechanism 80 includes a hammer member 142 attached rotatably to a shaft 144. One end 142a of the hammer member 142 is coupled rotatably to a shaft 146 of an arm 148. The other end 142b of the hammer member 142 is equipped with a flag piece 150. The arm 148 is coupled to the solenoid 154.

A coil spring 152 attached to the shaft 144 of the hammer member 142 biases the member counterclockwise. A roller type hammer 156 is attached rotatably to an intermediate position of the hammer member 142. A bracket 158 has a hammer sensor 160 that detects the flag piece 150 attached to the end 142b of the hammer member 142. The hammer sensor 160 is illustratively a transmission type photo sensor made of a light-emitting diode and a photo-diode. The flag piece 150 is arranged to be inserted between light-emitting diode and photo-diode. In the state of FIG. 12 in which the hammer 156 has hit the leader block 56, the flag piece 150 is outside the hammer sensor 160. This allows the photo-diode to receive light from the light-emitting diode. When the solenoid 154 is demagnetized to let the hammer 156 return to its retracted position, the flag piece 156 is inserted into the hammer sensor 160. This prevents the photo-diode from receiving light from the light-emitting diode. Where the light received by the photo-diode is taken out as an electrical signal, the position of the hammer 156 is verified thereby.

Figure 12:
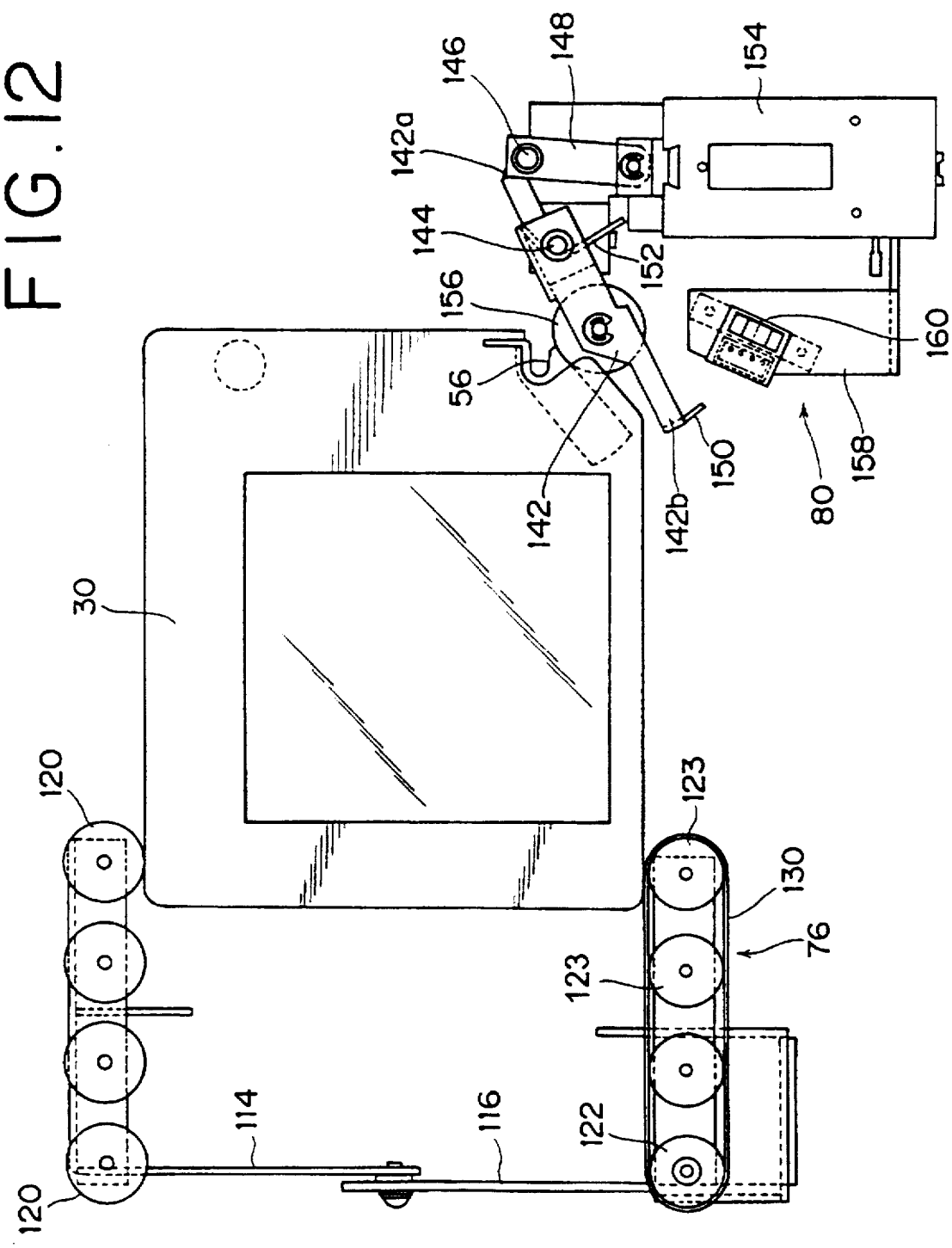
FIG. 12 is a schematic plan view of a hammer mechanism for striking at the leader block according to the invention.

In operation, the two catch arms 114 and 116 of the feeder mechanism 76 grip the cartridge 30 elastically, assisted by the force of the coil spring 140 as shown in FIGS. 11B and 12. With the cartridge 30 gripped by the catch arms 114 and 116, magnetizing the solenoid 154 of the hammer mechanism 80 causes the hammer 156 to hit the leader block 56. When the solenoid 154 is magnetized, the hammer member 142 is rotated clockwise around the shaft 144 to make the hammer 156 hit the leader block 56 of the cartridge 30. The hit pushes the leader block 56 into position if the leader block 56 was slightly disengaged. When the solenoid 154 is demagnetized, the spring 152 causes the hammer member 142 to rotate counterclockwise. This allows the hammer 156 to separate from the leader block 56 to let the flag piece 150 go into the hammer sensor 160.

The hitting against the leader block 56 is carried out every time the cartridge 30 is gripped by the feeder mechanism 76. Even if the leader block 56 of a given cartridge is slightly disengaged, the hammer mechanism 80 pushes the leader block 56 securely into position when that cartridge is loaded into the apparatus. The cartridge 30 with its leader block 56 hit by the hammer 156 is transported by the feeder mechanism 76 to the position of delivery of the accessor 20.

Figure 13:
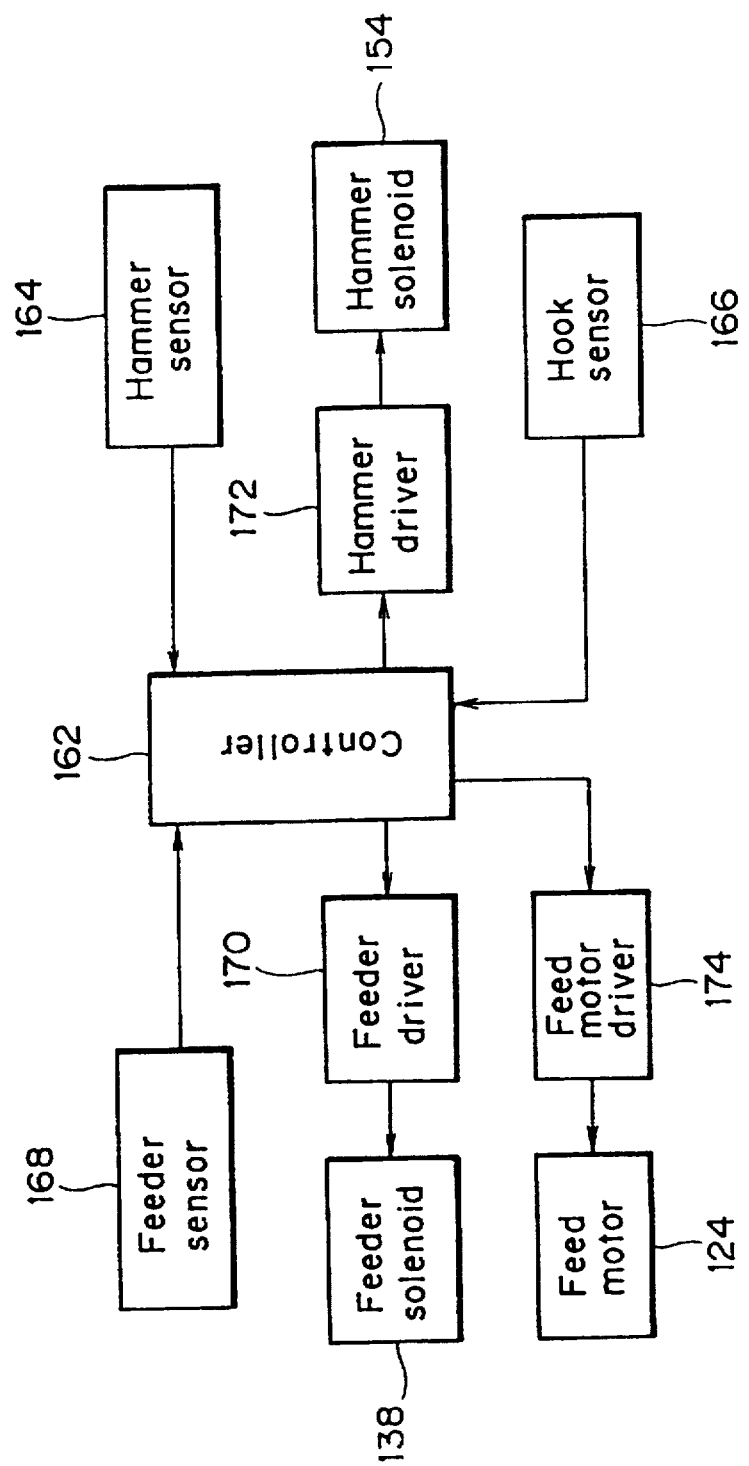
FIG. 13 is a block diagram of a control system for use with the magnetic tape cartridge entry device.

FIG. 13 is a block diagram of a control system for use with the magnetic tape cartridge entry device. The control system comprises a controller 162 that receives signals from a hammer sensor 164, a hook sensor 166 and a feeder sensor 168. In response to the sensor data received, the controller 162 outputs drive signals to a feeder driver 170, a hammer driver 172 and a feed motor driver 174. The drivers 170, 172 and 174 magnetize the feeder solenoid 138 and hammer solenoid 154 and activate the feed motor 124, respectively.

Figure 14:
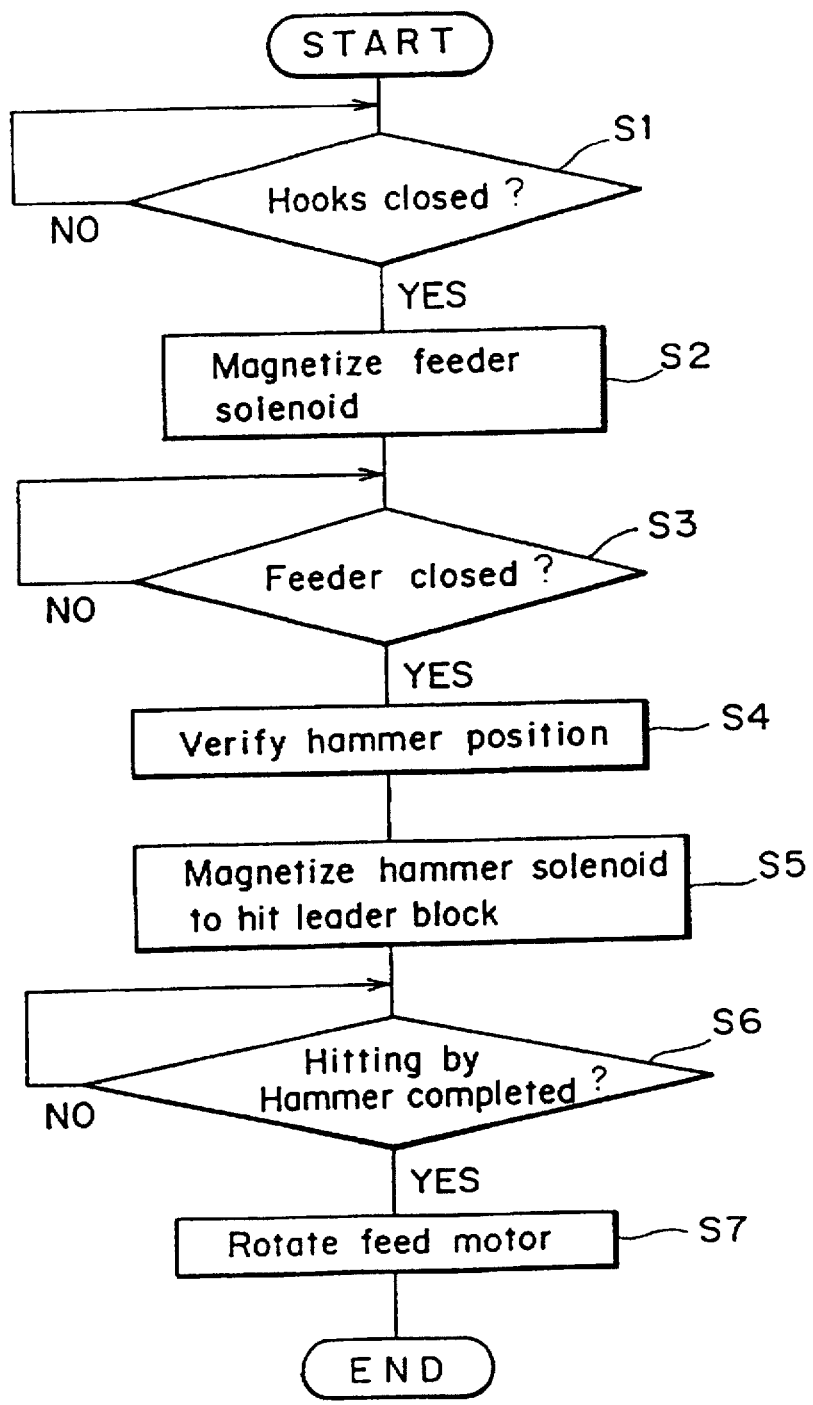
FIG. 14 is a flowchart of steps in which the hammer mechanism hits the leader block.

How the hammer mechanism 80 hits the leader block 56 will now be described with reference to the flowchart of FIG. 14. In step 1, a check is made to see if the hooks are closed on the basis of the signal from the hook sensor 166. If the hooks are found to be closed so that the lowest cartridge 30 is separated from the cartridges thereabove, step 2 is reached. In step 2, the feeder solenoid 138 is magnetized via the feeder driver 170. In step 3, a check is made to see if the feeder is closed. If the feeder is found to be closed so that the cartridge 30 is gripped thereby, step 4 is reached. In step 4, it is verified based on the signal from the hammer sensor 164 that the hammer 156 is in its retracted position.

In step 5, the hammer solenoid 154 is magnetized via the hammer driver 172 to make the hammer 156 hit the leader block 56. The hit pushes the leader block 56 into position. In step 6, it is ascertained based on the signal from the hammer sensor 164 that the hammer has returned to its retracted position. In step 7, the feed motor 124 is rotated via the feed motor driver 174. Rotating the feed motor 124 causes the feeder mechanism 76 to transport the cartridge 30 to the appropriate position for delivery to the accessor 20.

Figure 15:
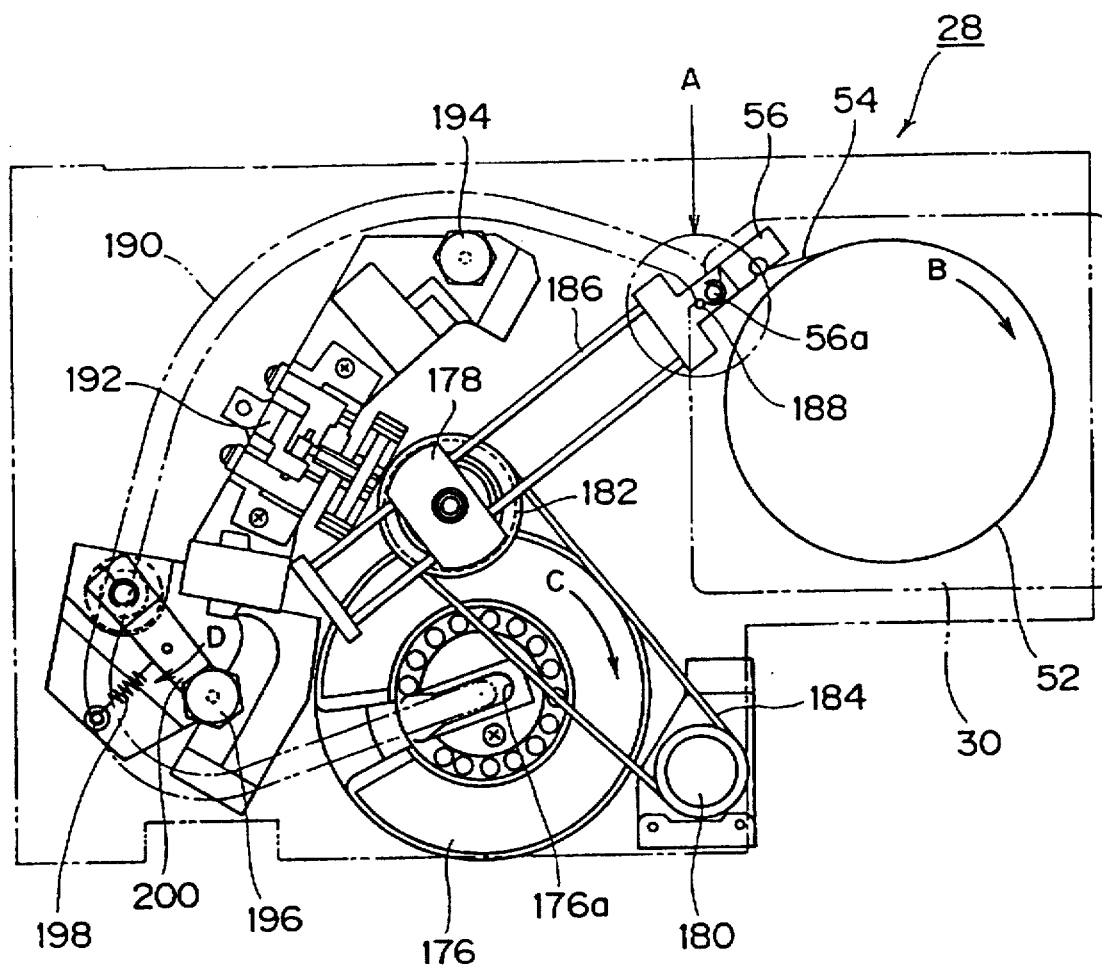
FIG. 15 is a plan view of a magnetic tape drive unit as part of the embodiment, phantom lines indicating the housing of the unit.

The constitution and the operation of the magnetic tape drive unit 28 will now be described with reference to FIG. 15. When the cartridge 30 is inserted into the magnetic tape drive unit 28, the tape reel 52 within the cartridge is rotated in the arrowed direction B by a drive motor, not shown. The rotation applies back tension to the magnetic tape 54. A machine reel 176, which takes up the magnetic tape 54, is arranged to be rotated in the arrowed direction C by a drive motor, also not shown.

Figure 16:
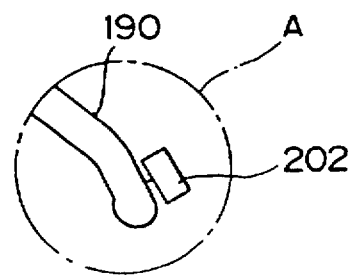
FIG. 16 is an enlarged view of part A in FIG. 15.

A holding member 178 is attached rotatably to the approximate center of the magnetic tape drive unit 28. The holding member 178 is rotated by a motor 180 via a belt 184 and a pulley 182. A sled arm 186 is attached slidingly to the holding member 178. The tip of the sled arm 186 has a sled pin 188 for engaging with the engagement groove 56a of the leader block 56. A slider, not shown, is attached to the tip of the sled arm 186 on the side opposite to the projecting direction of the sled pin 188. The slider is engaged with a guide 190 formed on the base of the magnetic tape drive unit 28. The guide 190 guides the sled pin 188 up to the machine reel 176. A magnetic head 192 writes and reads data to and from the magnetic tape 54. Guide rollers 194 and 196 for contacting the magnetic tape 54 are provided rotatably on both sides of the magnetic head 192. The guide roller 196 is attached to the tip of an arm 200 biased by a spring 198 in the arrowed direction D. The guide roller 196 thus applies tension to the magnetic tape 54. As shown in FIG. 16, a sensor 202 is provided adjacent to the tip of the guide 190. The sensor 202 checks to see if the leader block 56 of the cartridge 30 is in its normally engaged position.

In operation, the cartridge 30 is first inserted into the magnetic tape drive unit 28, and the motor 180 is activated. This causes the sled arm 186 to rotate clockwise, engaging the sled pin 188 with the engagement groove 56a of the leader block 56 belonging to the cartridge 30. With the engagement completed, the sled arm 186 is rotated counterclockwise to move the slider along the guide 190 until the leader block 56 engages with the engagement groove 176a of the machine reel 176. When the machine reel 176 rotates in the arrowed direction C, the magnetic tape 54 is taken up by the reel 176 through sliding contact with the guide roller 194, magnetic head 192 and guide roller 196. While in contact with the magnetic tape 54, the magnetic head 192 writes or reads data thereto or therefrom.

After the data read/write operation on the magnetic tape 54, the tape reel 52 is rotated in the arrowed direction B so that the magnetic tape 54 will be rewound into the cartridge 30. With the magnetic tape 54 completely rewound, the grip hand 25 again takes hold of the cartridge 30 and brings it back to the appropriate cell in the cell drum 12.

Figure 17:
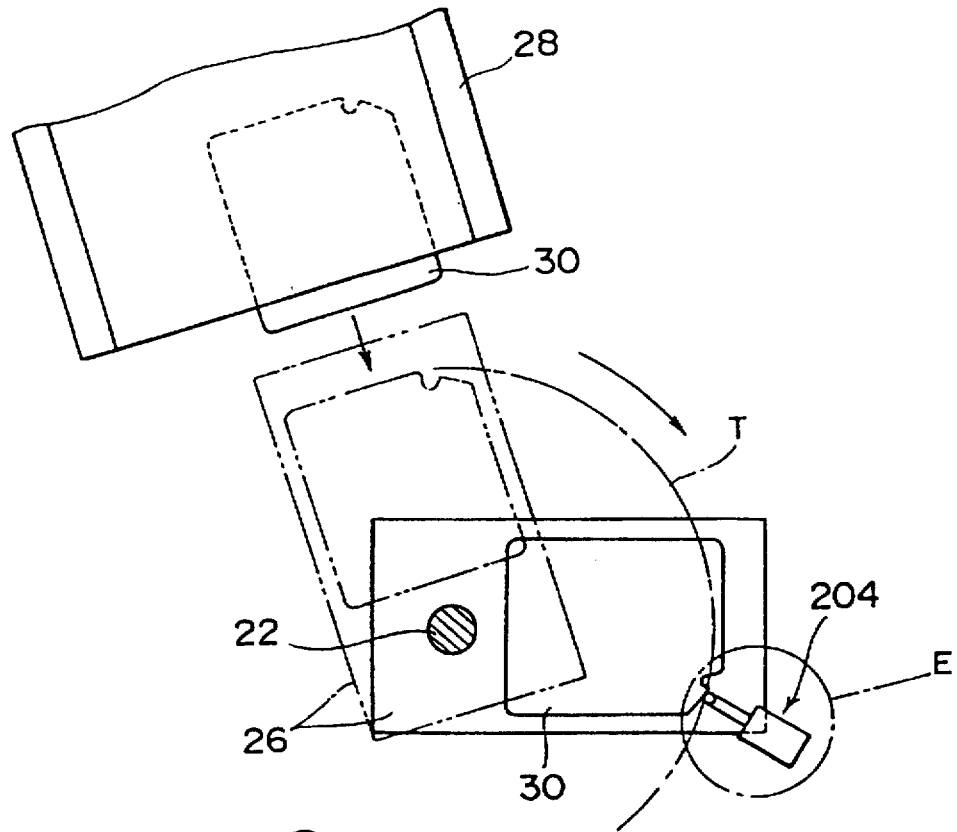
FIG. 17 is a schematic plan view of an alternative leader block engaging mechanism.

An alternative leader block engaging mechanism according to the invention will now be described with reference to FIGS. 17 and 18. In FIG. 17, a leader block engaging mechanism 204 is provided on and operable in a rotation locus T of the cartridge 30 gripped by the hand mechanism 26. In the figure, the grip hand of the hand mechanism 26 is omitted.

Figure 18:
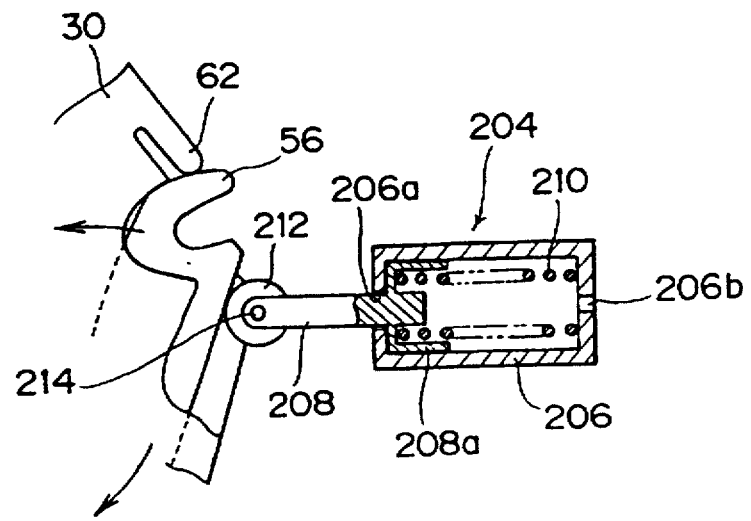
FIG. 18 is an enlarged partial cross-sectional view of part E in FIG. 17.

The leader block engaging mechanism 204 is structured as shown in FIG. 18. On one end of a cylindrical casing 206 is a hole 206a through which a pin 208 penetrates; on the other end of the casing 206 is an air vent hole 206b. The base side of the pin 208 inserted in the cylindrical casing 206 has a flange 208a to keep the pin in place. The casing 206 accommodates a coil spring 210 that biases the tip of the pin 208 in the direction of the hand mechanism 26.

The tip of the pin 208 has a slot to which is attached rotatably, via an end pin 214 a roller 212 that contacts the leader block 56 of the cartridge 30. The spring constant of the coil spring 210 is such as to allow the roller 212 to push the leader block 56 with an appropriate pressure.

When the cartridge 30 is inserted into the magnetic tape drive unit 28, the sensor arrangement checks to see if the leader block 56 is normally engaged. If the leader block 56 is found to be disengaged, the grip hand 25 of the hand mechanism 26 takes hold of the cartridge 30, and the hand mechanism 26 is rotated clockwise around the guide member 22. This causes the leader block 56 of the cartridge 30 to collide with the roller 212 of the leader block engaging mechanism 204. The collision pushes the leader block 56 of the cartridge 30 into position.

With the above-described leader block engaging mechanism 204, the pin 208 is biased by the coil spring 210 whose biasing force is set so as to have the roller 212 push the leader block 56 with an optimum pushing pressure. In this setup, an excess pressure applied to the coil spring 210 for pushing the leader block 56 contracts the spring 210 so as to prevent breakage of the leader block 56 and the leader block engaging mechanism 204.

The roller 212 attached rotatably to the tip of the pin 208 reduces the friction with the leader block 56 when coming in contact therewith. This allows the leader block 56 to be pushed into position smoothly. The hole 206b made at one end of the cylindrical casing 206 permits the air compressed inside by an overloaded pin 208 to bleed. This eliminates reaction that would otherwise be caused by air compression.

Figure 19:
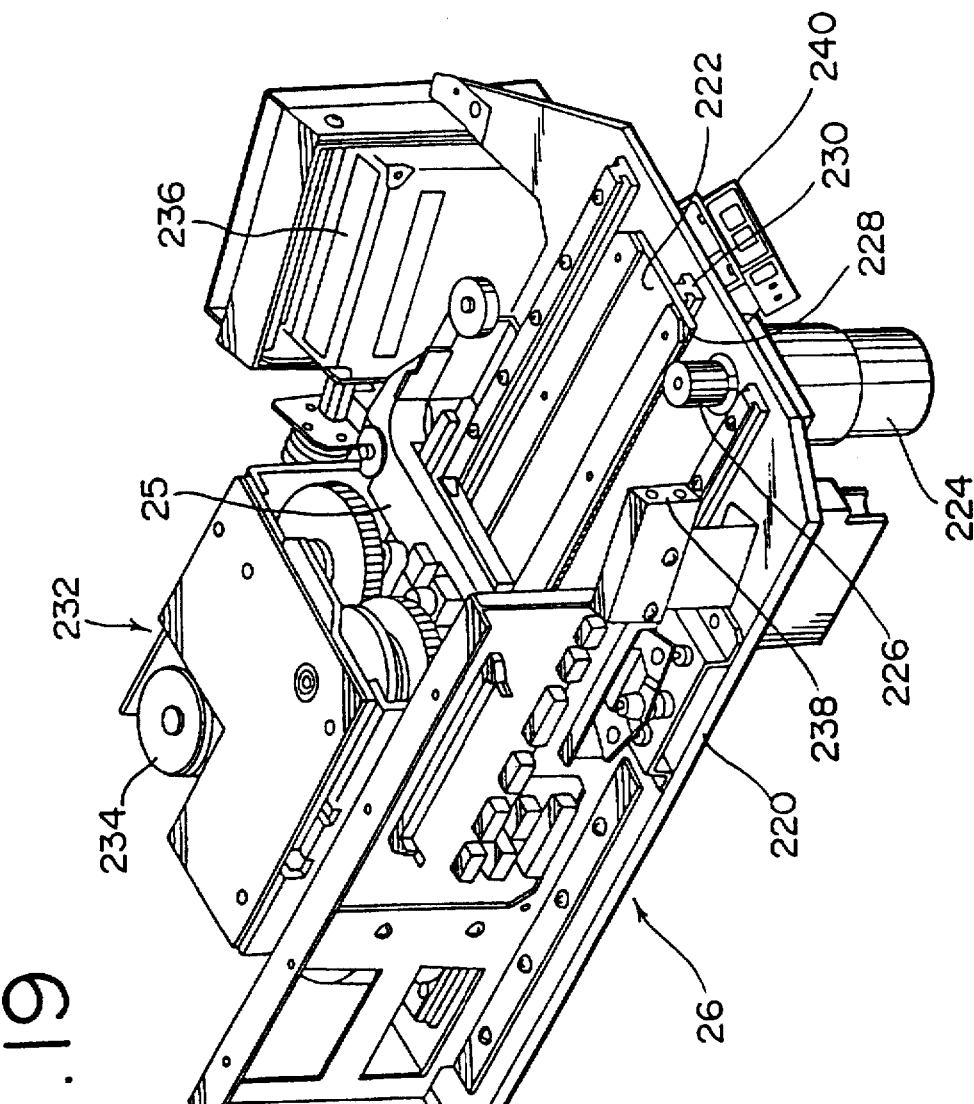
FIG. 19 is a perspective view of a hand mechanism of an accessor.

The hand mechanism 26 of the accessor 20 will now be described in more detail with reference to FIG. 19. On a base 220, a tray 222 is provided slidingly between its retracted position shown in the drawing and a projected position in front of the base 220. A pinion 226 coupled to the output shaft of a motor 224 is engaged with a rack 228 attached to the side of the tray 222. Activating the motor 224 moves the tray 222 slidingly along a guide rail 230. A grip hand unit 232 is also mounted slidingly on the base 220. The front end of the grip hand unit 232 is equipped with the grip hand 25 for gripping the magnetic tape cartridge.

Activating a motor 234 moves the grip hand unit 232 slidingly between its retracted position shown in the drawing and an advanced position in which the tip of the hand 25 projects slightly from the base 220. A bar code reader 236 is provided to read the bar code of the magnetic tape cartridge 30 gripped by the grip hand 25. Photo sensors 238 and 240 are used to position the accessor 20 and detect the cartridge, respectively.

Figure 20:
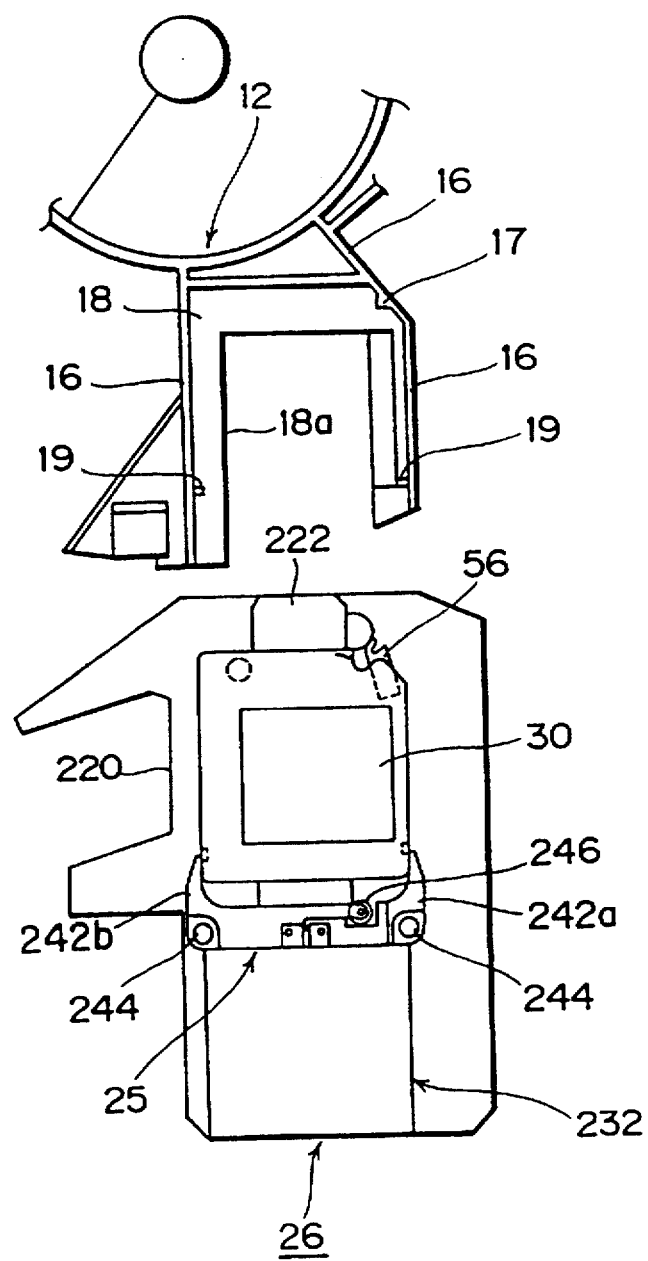
FIG. 20 is a view showing how a cartridge is to be placed into a cell, with a grip hand of the accessor in retracted position.
Figure 21:
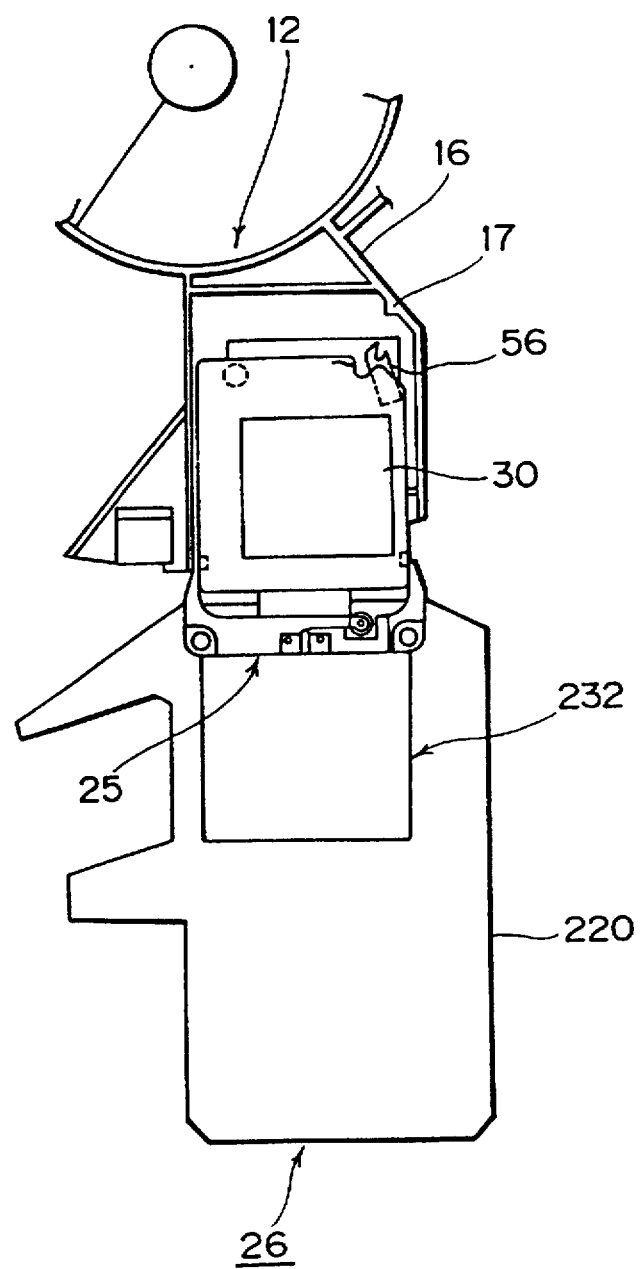
FIG. 21 is a view depicting how the cartridge is accommodated in the cell, the grip hand of the cell in advanced position.
Figure 22:
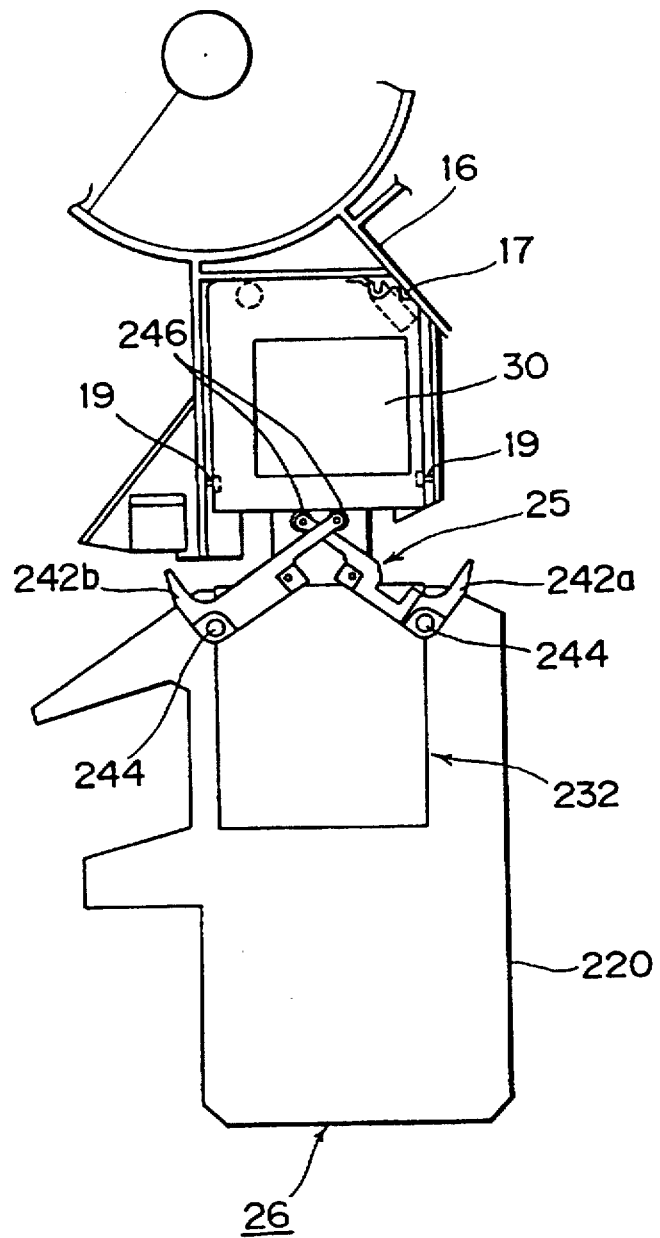
FIG. 22 is a view illustrating how the leader block of the cartridge is pushed against a projection of the cell.

A leader block engaging mechanism utilizing the pushing force of the grip hand 25 according to the invention will now be described with reference to FIGS. 20 through 22. In FIG. 20, a projection 17 is formed on a predetermined position of partitions 16 defining each cell 18 of the cell drum 12. The cell 18 has an opening 18a into which the tray 222 of the accessor 20 is inserted. On both sides of the opening 18a are a pair of projections 19 with which the grooves 64 of the cartridge 30 are to be engaged. The grip hand 25 of the hand mechanism 26 is constituted by a pair of L-shaped fingers 242a and 242b fixed to shafts 244. The shafts 244 are rotated by driving means, not shown. The L-shaped fingers 242a and 242b use their tips on one end to grip the magnetic tape cartridge 30 as illustrated. The other ends of the fingers 242a and 242b have rollers 246 attached rotatably therewith.

FIG. 20 shows the leader block 56 of the cartridge 30 as it is disengaged from the latch 62. To place the cartridge 30 into the cell 18 from the state shown involves the following operations. First, the tray 222 of the hand mechanism 26 is moved forward for entry into the opening 18a. The grip hand unit 232 is then moved up to its advanced position.

From the state above, the two shafts 244 are rotated in directions opposite to each other. This releases the hold on the cartridge 30 by the grip hand 25 and causes the rollers 246 at the ends of the fingers 242a and 242b to push the cartridge 30 into the cell 18, as shown in FIG. 22. The projection 17 formed on the oblique partition 16 comes into forced contact with the leader block 56 when the cartridge 30 is pushed in by the grip hand 25. The reaction to the pushing force engages the leader block 56 with the latch 62 of the cartridge 30.

The tray 222 then returns to its retracted position. This allows the cartridge 30 to fall slightly inside the cell 18 so that the grooves 64 of the cartridge 30 engage with the projections 19 of the cell 18. The engagement prevents the cartridge 30 from getting out of the cell 18 inadvertently due to vibrations or other disturbances. Since all cells 18 in the cell drum 12 of the above setup are equipped with the projection 17 each, putting any one magnetic tape cartridge 30 into the cell of the corresponding address engages its leader block 56 simultaneously.

The magnetic tape library apparatus generally contains a special cell dedicated for use by the customer engineer for maintenance and other customer-related services. Instead of forming a projection 17 on every cell in the cell drum 12, only the above-mentioned dedicated cell may alternatively be provided with the projection 17. In this case, the dedicated cell may be installed either inside the cell drum 12 or in a location independent of the cell drum 12.

When a disengaged leader block 56 of any cartridge 30 is detected in the magnetic tape drive unit 28, the accessor 30 transports that cartridge to the dedicated cell for storage therein. Once stored in the dedicated cell, the cartridge 30 has its leader block 56 pushed into position. The cartridge 30 with its leader block 56 thus reengaged is either reinserted into the magnetic tape drive unit 28 for continuous processing or stored into a predetermined cell 18 inside the cell drum 12 for subsequent processing.

As many apparently different embodiments of this invention may be made without departing from the spirit and scope thereof, it is to be understood that the invention is not limited to the specific embodiments thereof except as defined in the appended claims.

What is claimed is:

1. A magnetic tape library apparatus comprising:

a cell unit having a plurality of cells each accommodating a magnetic tape cartridge, said magnetic tape cartridge including a magnetic tape, a leader block attached to a tip of said magnetic tape and a latch for engaging with said leader block;

a magnetic tape drive unit for writing and reading data to and from said magnetic tape in said magnetic tape cartridge;

an accessor for automatically switching magnetic tape cartridges between said cell unit and said magnetic tape drive unit, said accessor including a guide furnished perpendicularly, a hand mechanism attached to said guide so as to swing horizontally on a plane perpendicular to said guide, and first driving means for moving said hand mechanism within a horizontal plane; and leader block engaging means provided on and operable in a rotating locus of said magnetic tape cartridge held by said hand mechanism said, leader block engaging means being fixed independently from said guide and said hand mechanism of said accessor in a position in the rotating locus;

wherein said hand mechanism is swung horizontally along the rotating locus by said first driving means toward said leader block engaging means to a position in which said leader block is engageable by said leader block engaging means to ensure that said leader block is secured by said latch.

2. A magnetic tape library apparatus according to claim 1, wherein said leader block engaging means comprises:

a pin having an end and a base provided at a position for striking said leader block; and a spring for urging said pin toward said leader block when the magnetic tape cartridge held by said hand mechanism is swung to strike said pin.

3. A magnetic tape library apparatus according to claim 2, wherein said leader block engaging means further comprises a roller attached rotatably to said end of said pin.

* * * * *